(12) United States Patent
Avons et al.

(10) Patent No.: US 9,897,019 B2
(45) Date of Patent: Feb. 20, 2018

(54) DEVICE AND METHOD FOR CONTROLLING THE OPERATION OF AN EXHAUST GAS RECIRCULATION VALVE USING AN IGNITION ADVANCE MANAGEMENT DEVICE

(71) Applicant: RENAULT S.A.S., Boulogne Billancourt (FR)

(72) Inventors: Vincent-Pierre Avons, Paris (FR); Cedric Harter, Etampes (FR)

(73) Assignee: RENAULT S.A.S., Boulogne Billancourt (FR)

( * ) Notice: Subject to any disclaimer, the term of this patent is extended or adjusted under 35 U.S.C. 154(b) by 32 days.

(21) Appl. No.: 15/103,730

(22) PCT Filed: Nov. 14, 2014

(86) PCT No.: PCT/FR2014/052902
§ 371 (c)(1),
(2) Date: Jun. 10, 2016

(87) PCT Pub. No.: WO2015/086936
PCT Pub. Date: Jun. 18, 2015

(65) Prior Publication Data
US 2016/0312717 A1   Oct. 27, 2016

(30) Foreign Application Priority Data
Dec. 12, 2013 (FR) ...................... 13 62476

(51) Int. Cl.
*F02D 35/00* (2006.01)
*F02D 41/00* (2006.01)
(Continued)

(52) U.S. Cl.
CPC .......... *F02D 35/027* (2013.01); *F02D 37/02* (2013.01); *F02D 41/0077* (2013.01);
(Continued)

(58) Field of Classification Search
CPC .. F02D 35/027; F02D 41/0077; F02D 41/221; F02D 37/02; F02M 26/49; F02P 51/1516; F02P 51/152
(Continued)

(56) References Cited

U.S. PATENT DOCUMENTS 4,960,094 A    10/1990  Koike et al.
5,140,961 A *   8/1992  Sawamoto ............ F02D 41/221
                                              123/406.27
(Continued)

FOREIGN PATENT DOCUMENTS

DE    39 34 017 A1    4/1990

OTHER PUBLICATIONS

International Search Report dated Feb. 25, 2015, in PCT/FR2014/052902 Filed Nov. 14, 2014.
(Continued)

*Primary Examiner* — Mahmoud Gimie
(74) *Attorney, Agent, or Firm* — Oblon, McClelland, Maier & Neustadt, L.L.P.

(57) ABSTRACT

An engine includes at least one spark plug, an ignition advance management device to determine and to apply an optimum ignition advance of the spark plug, and an exhaust gas recirculation device equipped with a gas recirculation control valve. A control device for the internal combustion engine includes a first actuator to force opening and closing of the control valve, a map in which are stored theoretical ignition advance values as a function of engine speed and engine load, a first calculator to calculate a diagnostic criterion as a function of the theoretical ignition advance determined from the map and the optimum ignition advance, and a comparator to compare the diagnostic criterion to a control valve failure threshold.

13 Claims, 5 Drawing Sheets

Figure 1:
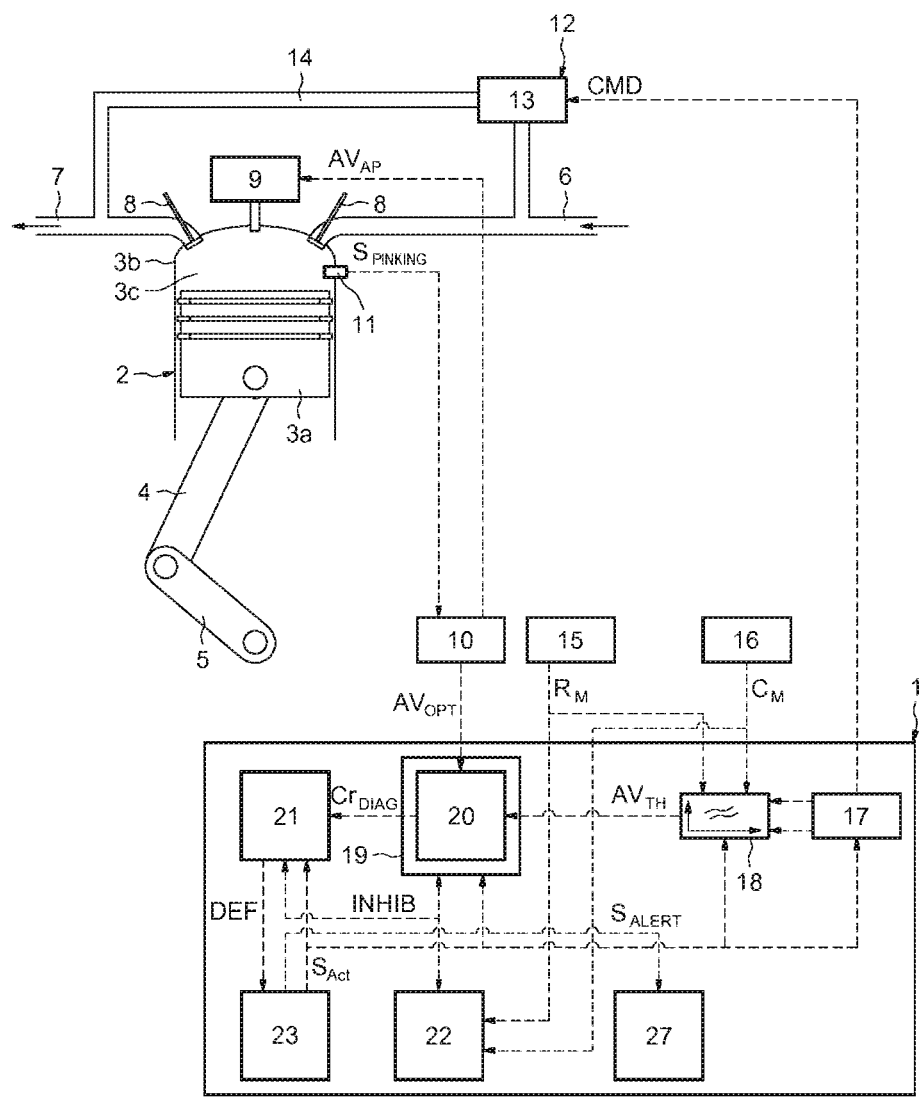

(51) Int. Cl.
    *F02D 35/02*     (2006.01)
    *F02P 5/152*     (2006.01)
    *F02P 5/15*     (2006.01)
    *F02D 41/22*     (2006.01)
    *F02D 37/02*     (2006.01)
    *F02M 26/49*     (2016.01)

(52) U.S. Cl.
    CPC ........... *F02D 41/221* (2013.01); *F02M 26/49*
        (2016.02); *F02P 5/152* (2013.01); *F02P*
        *5/1516* (2013.01); *Y02T 10/47* (2013.01)

(58) Field of Classification Search
    USPC ..................................................... 123/568.16
    See application file for complete search history.

(56) References Cited

U.S. PATENT DOCUMENTS 5,241,937 A *   9/1993   Kanehiro ................ F02P 17/12
                                                        123/406.27
    5,639,961 A     6/1997   Lautenschuetz

OTHER PUBLICATIONS

French Search Report dated Aug. 20, 2014, in FR 13 62476 Filed Dec. 12, 2013.

* cited by examiner

DEVICE AND METHOD FOR CONTROLLING THE OPERATION OF AN EXHAUST GAS RECIRCULATION VALVE USING AN IGNITION ADVANCE MANAGEMENT DEVICE

The present invention concerns a device and a method for controlling the operating status of a device for recirculating the exhaust gases in a controlled ignition engine and more particularly for monitoring failure of opening and closing of the exhaust gas recirculation control valve.

The exhaust gas recirculation (EGR) technology, applied to controlled ignition engines, makes it possible to increase the resistance of the engine to pinking. Pinking is an instantaneous and mass self-ignition of a portion of the mixture not yet burned, raised to a high temperature and pressure by the movement of the piston and by the release of energy caused by the propagation of the flame front. There results from this a local increase in pressure followed by vibration of the gaseous mass. The latter leads to excessive mechanical and thermal stresses, possibly generating serious destructive incidents: blowing of the cylinder head gasket, binding or partial melting of the piston, deterioration of the cylinder head and valves. The risk of pinking is increased if too large an ignition advance is applied or the volumetric compression ratio of the engine is too high. By attenuating the risk of pinking, the exhaust gas recirculation technology makes it possible to increase the ignition advance and the volumetric compression ratio of the engine. This results in an improvement of the efficiency of the engine cycle.

Thus there are known exhaust gas recirculation systems including a recirculation duct disposed between the exhaust duct and the inlet duct of the engine and by means of which some of the exhaust gases may be recirculated. In order to control the quantity of exhaust gas introduced into the mixture injected into the engine, known recirculation systems are equipped with a gas recirculation control valve.

Such a valve is not entirely satisfactory, however, given that it operates in a difficult environment that can lead to soiling and clogging thereof by oily hydrocarbons. In particular, the control valve sticking in the open position causes a loss of power, acceleration defects and occasionally smoke and misfiring of the engine.

In view of the foregoing, the object of the invention is to propose a control device able to detect immobilization of the exhaust gas recirculation valve.

The subject of the invention is therefore a control device for an internal combustion engine. The engine includes at least one spark plug, an ignition advance management device able to determine and to apply an optimum ignition advance of the spark plug, and an exhaust gas recirculation device equipped with a gas recirculation control valve.

According to one of its general features, the control device includes:
first actuating means able to force opening and closing of the control valve,
a map in which are stored theoretical ignition advance values as a function of the engine speed and the engine load,
first calculation means able to calculate a diagnostic criterion as a function of the theoretical ignition advance determined from the map and the optimum ignition advance, and
comparison means able to compare the diagnostic criterion to a control valve failure threshold.

Thus, using measuring means already included in the engine and simple calculation means, it is possible to generate a diagnostic criterion representative of a failure of the control valve of the exhaust gas recirculation device of the engine.

In one embodiment, the ignition advance management device includes a pinking sensor able to detect the appearance of a phenomenon of pinking in the engine.

For example, the optimum ignition advance determined by the management device is the highest ignition advance prior to detection by the pinking sensor of a phenomenon of pinking in the engine.

Thus, it is possible to determine an optimum ignition advance taking into account the risk of pinking, which is influenced by the degree of opening of the control valve of the gas recirculation device.

In one embodiment, the first calculation means include a first comparator, the diagnostic criterion being equal to the difference between the optimum ignition advance and the theoretical ignition advance.

There may also be provided second calculation means able to detect if predefined diagnostic conditions are combined to inhibit the first calculation means and the comparison means if these conditions are not combined.

For example, the diagnostic conditions include at least one condition chosen from a condition bearing on the engine speed that must be substantially constant for a predefined time and a condition bearing on the engine load that must be substantially constant for a predefined time.

This device therefore has the advantage of making possible control of the operating status of the control valve regardless of the operating point of the engine, provided that the latter is substantially stable in terms of engine speed and engine load.

There may further be provided display means able to signal a failure of the control valve if the diagnostic criterion is above the failure threshold.

In one embodiment, the control device further includes iteration means including:
a counter intended to be reset to zero at the start of the measurement and incremented on each iteration,
a second comparator able to compare the value held by the counter with a predefined number of iterations, and
third calculation means adapted, on each iteration, to store the calculated diagnostic criterion, to calculate the average of all the calculated diagnostic criteria once the number of iterations is reached, and to compare it to the control valve failure threshold.

In accordance with another aspect, the invention also concerns a method of controlling an internal combustion engine by means of a device as described above. According to one of these general features, this method includes the following steps:
a) the position of the control valve is modified,
b) the theoretical ignition advance is calculated by means of the map,
c) an optimum ignition advance is determined by means of the ignition advance management device,
d) the diagnostic criterion is calculated from the theoretical ignition advance and the optimum ignition advance, and
e) the diagnostic criterion is compared to a control valve failure threshold.

There may further be a first step in which it is detected if conditions of the diagnosis are combined, the diagnostic conditions including at least one condition chosen from a condition bearing on the engine speed that must be substantially constant for a predefined time and a condition bearing on the engine load that must be substantially constant for a predefined time.

In another embodiment the control device further includes display means, the control method including a final step in which a failure of the control valve is signaled by the display means if the diagnostic criterion exceeds the failure threshold.

In one embodiment, the ignition advance management device includes a pinking sensor able to detect the appearance of a pinking phenomenon in the engine, the step d) including the following substeps:

p) an initial ignition advance is determined from the quantity of exhaust gas introduced into the inlet duct and applied to the spark plug, q) if the sensor detects the presence of a pinking phenomenon, the method goes directly to the substep t), r) the applied ignition advance is increased by a predefined amount and this new ignition advance is applied to the engine, s) the method returns to the substep q), and t) the applied ignition advance is not changed and the optimum ignition advance is defined as being equal to this value.

In another example, the control device includes iteration means, the method including the following phases:

h) the counter is reset to zero, i) the steps a) to d) described above are applied, j) the value of the diagnostic criterion obtained in the phase i) is stored, k) the value held by the counter is incremented, l) the value held by the counter is compared to the number of iterations and if it is less than or equal to the number of iterations the method returns to the phase i), m) the average of the diagnostic criteria stored in the phases j) is calculated, and n) the average from the phase m) is compared with the control valve failure threshold.

Figure 2:
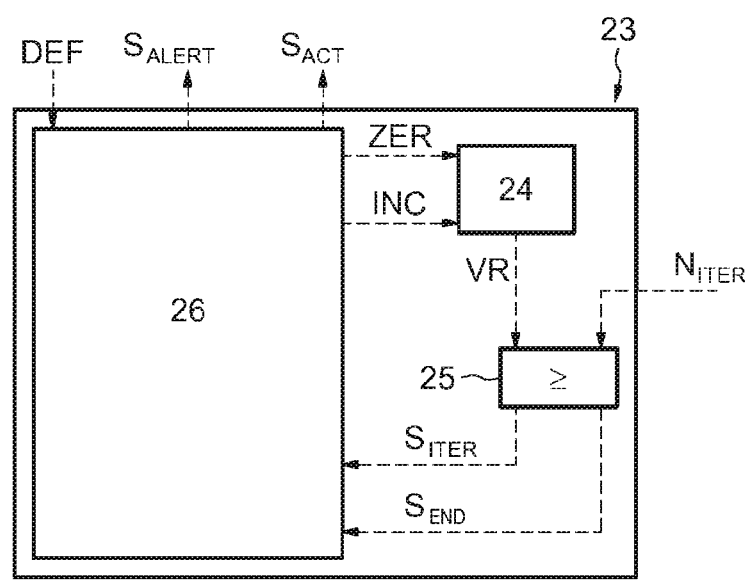
Figure 3:
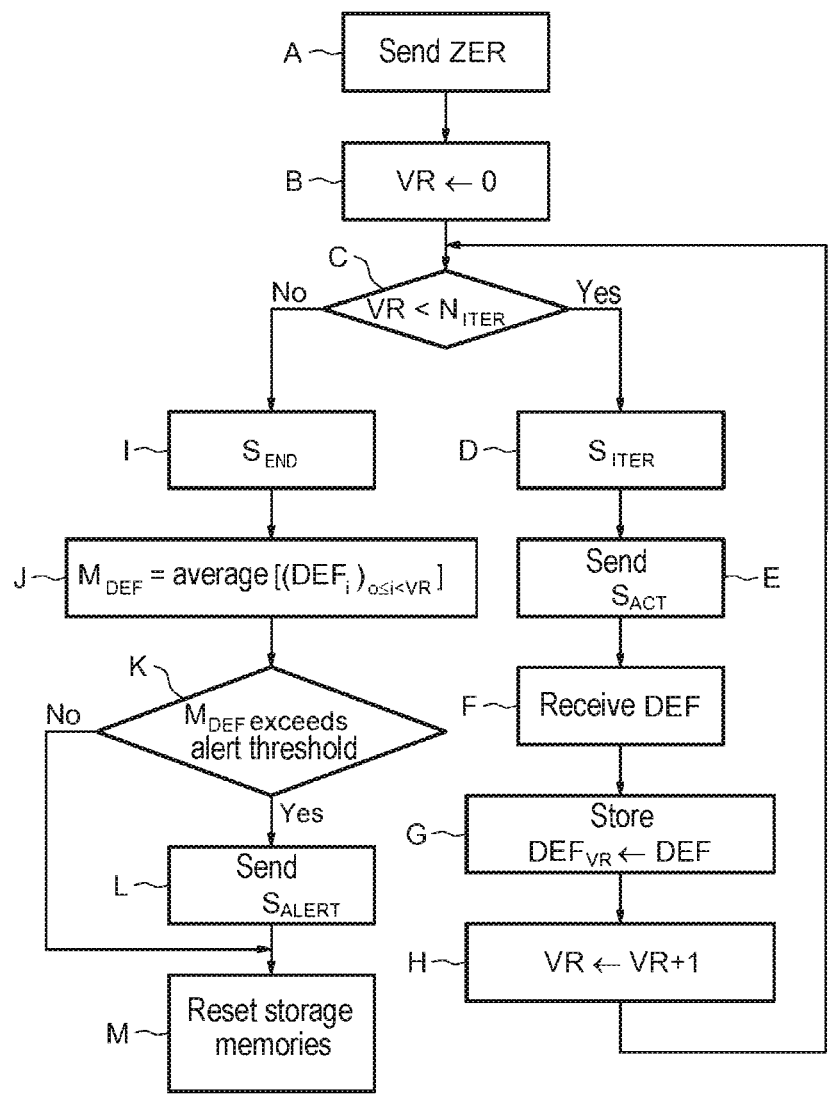
Figure 4:
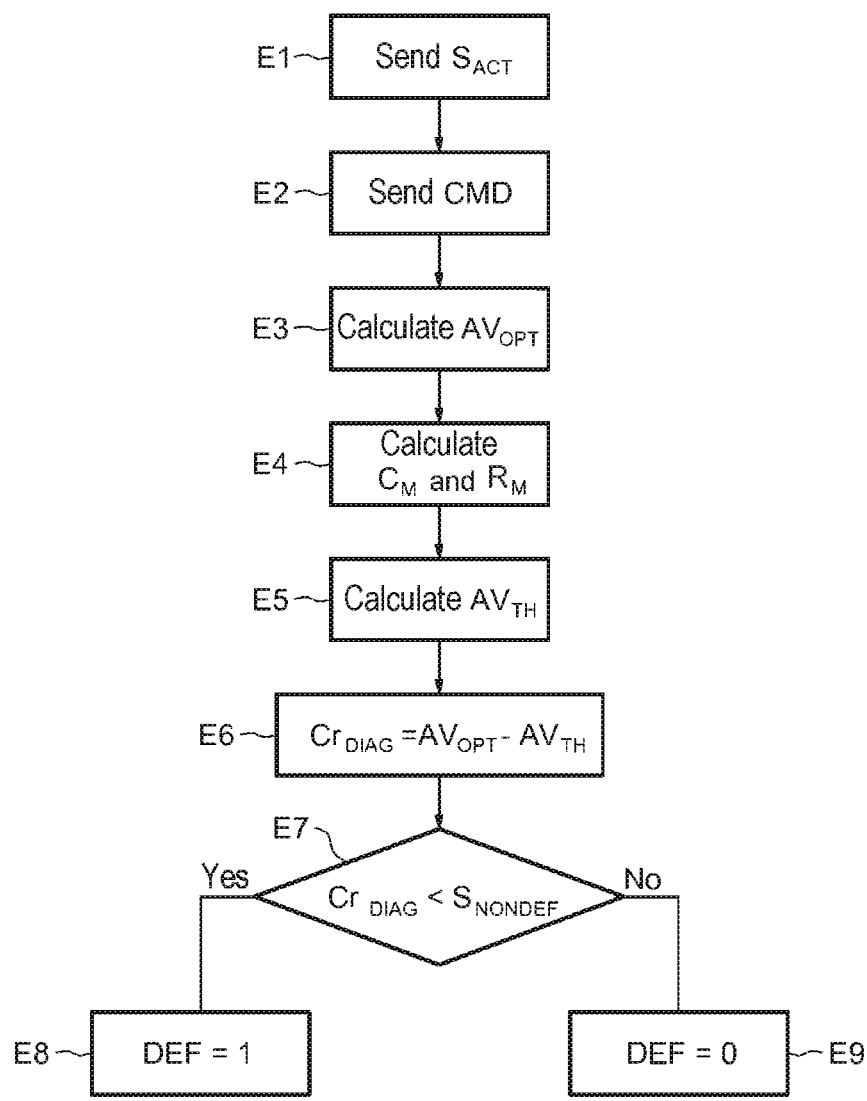
Figure 5:
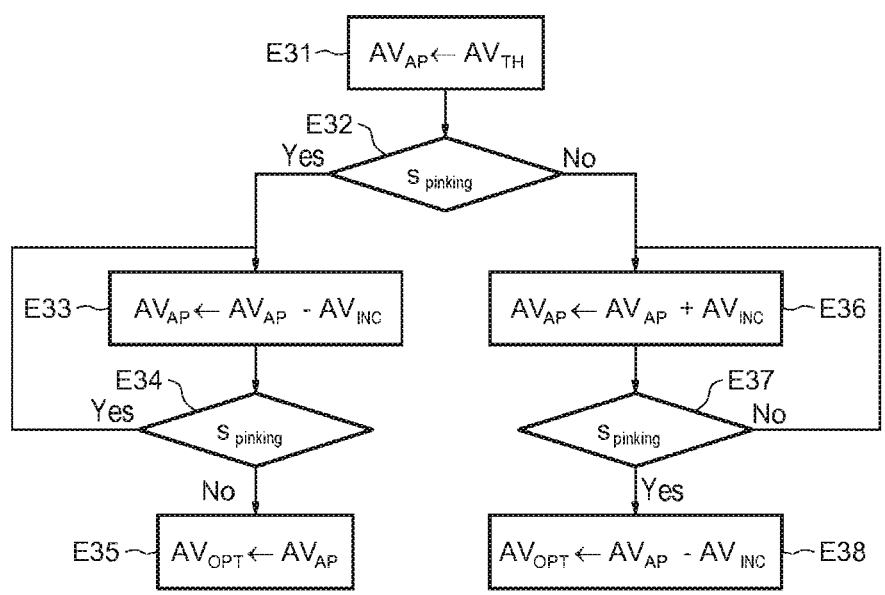

Other objects, features and advantages of the invention become apparent on reading the following description, which is given by way of nonlimiting example only and with reference to the appended drawings, in which:

FIG. 1 represents an operating diagram of a control device for a controlled ignition engine fitted with an exhaust gas recirculation device in accordance with one embodiment of the invention, FIG. 2 represents a detailed operating diagram of the iteration means of the control device from FIG. 1, FIG. 3 represents a control method in accordance with one embodiment of the invention including a plurality of iterations, FIG. 4 represents the detail of one iteration the control method from FIG. 3, and FIG. 5 represents the detail of the ignition advance calculation step of the control method from FIG. 3.

Reference will first of all be made to FIG. 1, which represents an operating diagram of a control device 1 for an internal combustion engine 2.

The internal combustion engine 2 includes a piston 3a sliding in a cylinder 3b delimiting a combustion chamber 3c. The piston 3a is connected to a crank 4 connected to a crankshaft 5. The engine 2 further includes an inlet duct 6 and an exhaust duct 7, said ducts communicating with the combustion chamber 3c. The engine is fitted with two valves 8 able to shut off the orifices of the ducts 6 and 7. The engine also includes a spark plug 9.

The ignition of the spark plug 9 is controlled by an ignition advance management device 10, by means of which an ignition advance $AV_{AP}$ is applied. The management device 10 is provided with a pinking sensor 11 able to detect the appearance of a pinking phenomenon in the engine 2. The function of the management device 10 is to calculate an optimum ignition advance $AV_{OPT}$, i.e. the highest applied ignition advance $AV_{AP}$ that averts the risk of pinking. In concrete terms, the management device 10 tests a plurality of applied ignition advance values $AV_{AP}$, where applicable detects the signal $S_{PINKING}$ on detection of pinking by the sensor 11, and determines an optimum ignition advance $AV_{OPT}$.

The engine further includes an exhaust gas recirculation device 12 including a gas recirculation duct 14 tapped on the one hand off the exhaust duct 7 and on the other hand into the inlet duct 6. The duct 14 is provided with a gas recirculation control valve 13 to control the quantity of exhaust gas injected into the air admitted into the combustion chamber 3c.

The engine 2 is also provided with first measuring means 15 for measuring its rotation speed $R_M$ and second measuring means 16 for measuring its load $C_M$.

The control device 1 includes first actuating means 17 able to adjust the opening of the control valve 13 by transmitting a variable signal CMD. It also includes a map 18 in which are stored values of a theoretical ignition advance $AV_{TH}$ as a function of the engine speed signal $R_M$ and the engine load signal $C_M$ delivered by the first measuring means 15 and the second measuring means 16, respectively, without taking account of any recirculation of the exhaust gases.

The device further includes first calculation means 19 for producing a diagnostic criterion $Cr_{DIAG}$ of the operating status of the control valve 13. To this end, the calculation means 19 collect the optimum ignition advance signal $AV_{OPT}$ determined by the management device 10 and the theoretical ignition advance signal $AV_{TH}$ determined by the map 18. A comparator 20 calculates the difference between the two signals $AV_{OPT}$ and $AV_{TH}$, referred to as the diagnostic criterion $Cr_{DIAG}$. Since the theoretical ignition advance $AV_{TH}$ is calculated from only the engine speed signal $R_M$ and the engine load signal $C_M$, it is considered that it is the optimum ignition advance if the control valve is closed.

It is therefore possible to obtain an indication of a failure of the control valve 13 by comparing the optimum ignition advance $AV_{OPT}$ and the theoretical ignition advance $AV_{TH}$ for the same operating point of the engine. For example, if the command to close the control valve 13 is issued, the optimum ignition advance value $AV_{OPT}$ must be substantially equal to the theoretical ignition advance $AV_{TH}$. In other words, the diagnostic criterion $Cr_{DIAG}$ is substantially zero. If this is not the case, if it exceeds a certain threshold, there is a failure of the system for opening and closing the control valve 13. In another instance, a command to open the control valve 13 may be issued. The diagnostic criterion $Cr_{DIAG}$ is compared to a non-failure threshold $S_{NONDEF}$. If $Cr_{DIAG}$ does not exceed the non-failure threshold, this means that the optimum ignition advance $AV_{OPT}$ in this situation in which the valve 13 is open is too close to the theoretical ignition advance $AV_{TH}$ and therefore that there is a failure of the control valve 13.

In this regard the control device 1 includes comparison means 21 for comparing the diagnostic criterion $Cr_{DIAG}$ to a plurality of thresholds such as the non-failure threshold $S_{NONDEF}$ referred to above. A number of control situations exist, for example open, closed, half-open, etc. positions. The comparison means 21 include for each situation a failure threshold or a non-failure threshold appropriate for detecting a failure of the control valve 13 in said situation. The comparison means 21 are able to produce a failure detection signal DEF. In the event of failure, the signal DEF is equal to 1; it is otherwise equal to 0.

The device 1 is able to diagnose the operating status of the control valve 13 when diagnostic conditions are combined, namely, for any operating point of the engine, provided that the engine speed and load are stable for a time of the order of magnitude of the time necessary to verify the operating status of the control valve 13. The control device 1 is also provided with second calculation means 22 the function of which is to detect if these diagnostic conditions are combined. If the conditions are not appropriate for the diagnosis, the calculation means 22 produce an inhibition signal INHIB that is sent to the calculation means 19 and to the comparison means 21. In this way, the calculation means 22 prevent the calculation and sending of the diagnostic criterion signal $Cr_{DIAG}$ and prevent the sending of the failure detection signal DEF. To determine if the signal INHIB must be sent or not, the second calculation means 22 analyze the engine speed signal $R_M$ and the engine load signal $C_M$ over a sampling time $T_{smp}$. The second calculation means 22 are notably able to detect if said signals $R_M$ and $C_M$ do not vary beyond a variation tolerance $\epsilon_r$ of the engine speed and a variation tolerance $\epsilon_c$ of the engine load, respectively, over the time $T_{smp}$.

The device 1 further includes iteration means 23 enabling a plurality of verifications of the operating status of the control valve 13 to be carried out. This improves the reliability of the control device. These iteration means 23 are therefore able to interact with the actuating means 17, the map 18, the calculation means 19 and the comparison means 21 to verify the value of the signal DEF a number of times. They then calculate an alert signal $S_{ALERT}$ that is sent to display means 27 by means of which the driver is warned of a failure in the exhaust gas recirculation device 12 of their vehicle.

FIG. 2 represents in detail the iteration means 23. The means 23 enable a plurality of iterations of verification of the operating status of the control valve 13 to be carried out in order to generate a more reliable failure alert signal. To this end the means 23 are able to receive the failure detection signal DEF and a signal $N_{ITER}$. The latter signal corresponds to the number of iterations required before issuing an alert in respect of failure of the operating status of the control valve. It is a predetermined parameter integrated into the system by the motor vehicle manufacturer. The means 23 include a counter 24, a second comparator 25 and third calculation means 26.

The function of the counter 24 is to count the number of iterations already carried out starting from an initialization time. Accordingly, on activation of the control device and at the end of each of the iterations the calculation means 26 send the counter 24 a signal ZER and a signal INC. The counter 24 is able to determine and to store a retained value VR. When the counter 24 receives the signal ZER, it sets it to zero. Each time that it receives the signal INC, it increments it by one unit and sends the one-off signal VR to the address of a comparator 25.

The comparator 25 compares the retained value VR and the number of iterations $N_{ITER}$ and generates a signal $S_{ITER}$ or a signal $S_{END}$. As long as VR is strictly less than $N_{ITER}$, the signal that is generated is the signal $S_{ITER}$. As soon as the two signals VR and $N_{ITER}$ are equal, or if the signal $N_{ITER}$ is greater than the retained value VR, the signal that is sent is the signal $S_{END}$.

The calculation means 26 are able to send an activation signal $S_{ACT}$ to the actuating means 17, to the map 18, to the calculation means 19 and to the comparison means 21, in order to command verification of the operating status of the control valve 13. The result of this is the value of the signal DEF that is collected by the means 26. On receiving the signal DEF, the means 26 send the signal INC to the address of the counter 24.

It must be remembered that the calculation means 26 process the signals $S_{ITER}$ and $S_{END}$ sent by the comparator 25. On the one hand, when the signal $S_{ITER}$ is sent by the comparator 25, the means 26 emit the signal $S_{ACT}$, hold the value of the signal DEF in a memory, and then send the signal INC. On the other hand, when they receive the signal $S_{END}$, the calculation means 26 calculate the average of all the signals DEF stored by the memory. They compare this to an alert threshold value and send the alert signal $S_{ALERT}$ if the average is above the threshold.

There can then no longer be any further iterations and the verification of the operating status of the control valve 13 is finished. To restart verification the calculation means 26 send the signal ZER.

FIG. 3 represents a method of controlling an internal combustion engine including a plurality of iterations by means of a device such as the control device from FIG. 1.

The control method begins with a first phase A in which the signal ZER is sent. This phase can be executed by the third calculation means 26 of the iteration means 23 of the control device. It is triggered by the onboard computer of the motor vehicle.

This phase A leads automatically to a phase B in which the variable VR retained in the counter 24 takes the value 0.

There then follows a test phase C in which the retained value VR and the preprogrammed number of iterations $N_{ITER}$ are compared by the comparator 25. In this example, $N_{ITER}=10$ and VR=0. Therefore VR<$N_{ITER}$. The phases of the branch associated with the "YES" response are therefore applied.

There is therefore applied a phase D consisting in sending the signal $S_{ITER}$. This phase D leads to a phase E executed by the calculation means 26. During this phase E the activation signal $S_{ACT}$ is sent to the actuating means 17, to the map 18, to the calculation means 19 and to the comparison means 21. As a result of this these four components function so that the control valve 13 is verified. At the end of this phase, the signal DEF is equal to 1 if a failure is detected or 0 otherwise. During a subsequent phase F the signal DEF is collected.

The following phase G consists in storing the value of the signal DEF in the memory. In this example, the value of the signal DEF is associated with the variable $DEF_{VR}$, i.e. $DEF_0$ here.

During the phase H, the value of VR is incremented by one unit, i.e. the result of the operation VR+1 is calculated, after which it is associated with the variable VR. This string of phases C to H is referred to as one iteration. Following this first iteration, therefore, VR=1.

As seen in FIG. 3, the phase C is then repeated. Given that the value of VR is 1, the answer to the question "VR<$N_{ITER}$?" is in the affirmative and the phases D, E, F, G and H are applied, in every respect as described, except that the value VR is equal to 1 until the phase H. During the phase H, this value has become 2 and a value $DEF_1$ has been stored.

These phases are applied up to the tenth iteration, following which VR=10. The response to the question in the phase C is therefore no, and there follows a phase I that consists in sending the signal $S_{END}$.

This triggers the phase J which consists the calculation means 26 calculating the average of the list of stored values $DEF_i$, i.e. the list of ten values $\{DEF_i/0 \le i < 9\}$.

During the test phase K, this average is compared with a predefined threshold value, for example 0.7. If the response is yes, there follows a phase L followed by a phase M. If the response is no, the method goes directly to this phase M.

The phase L consists in sending an alert signal $S_{ALERT}$ addressed to the display means 27.

The subsequent phase M consists in deleting all the values in memory, in particular VR and $DEF_i$.

FIG. 4 represents the detail of the phase E of the method from FIG. 3. It must be remembered that this phase consists in the iteration means 23 sending the signal $S_{ACT}$ addressed to the actuating means 17, to the map 18, to the calculation means 19 and to the comparison means 21. This leads to consequences resulting in a value of the signal DEF detecting failure of the control valve 13.

The phase E therefore begins with the step E1 of sending the signal $S_{ACT}$. This step is followed by a step E2 consisting in forcing the control valve 13 open or closed by the actuating means 17 sending the signal CMD. In this example, the control valve 13 is caused to open.

The subsequent step E3 consists in calculating the optimum ignition advance $AV_{OPT}$. That calculation is effected by the ignition advance management device 10. The optimum ignition advance $AV_{OPT}$ is otherwise applied to the spark plug 9.

During the step E4 the engine speed $E_M$ and the engine load $C_M$ are measured. The sensors 15 and 16 are used for this. The step E5 thereafter consists in using the measured values of $R_M$ and $C_M$ to calculate the theoretical ignition advance $AV_{TH}$, after which the object of the step E6 is to calculate the diagnostic criterion $Cr_{DIAG}$, equal in our example to the difference between the optimum ignition advance $AV_{OPT}$ and the theoretical ignition advance $AV_{TH}$.

There then follows a test step E7 during which the following question is posed: $Cr_{DIAG} < S_{NONDEF}$. It must be remembered that $S_{NONDEF}$ is the non-failure threshold and that there is failure of the control valve 13 if the diagnostic criterion $Cr_{DIAG}$ is below the threshold $S_{NONDEF}$. Consequently, if the response is "YES", there then follows a step E8 during which the value of the signal DEF becomes 1. If the response is "NO", a step E9 is applied during which the value of the signal DEF becomes 0.

FIG. 5 illustrates the method of obtaining the optimum ignition advance signal $AV_{OPT}$ by means of the management device 10 in the step E3 of the phase E of the method from FIG. 3.

This step begins with a substep E31 consisting in determining a value of the applied ignition advance $AV_{AP}$. In this example, the value of the theoretical ignition advance $AV_{TH}$ calculated by the map 18 is used.

A test substep E32 is then applied by means of the pinking sensor 11 of the ignition advance management device 10. This substep consists in detecting if a pinking phenomenon occurs or not. If yes, a substep E33 is applied. If no, a substep E36 is applied.

Note that because the theoretical ignition advance $AV_{TH}$ corresponds to an ignition advance suited to the operating conditions of the engine without gas recirculation it is relatively unlikely that pinking will occur as early as the step E32. The objective is to maintain the margin relative to the harmful pinking phenomenon before progressively increasing the applied ignition advance $AV_{AP}$.

The substep E33 consists in calculating the result of the operation $AV_{AP} - AV_{INC}$, where $AV_{INC}$ corresponds to the ignition advance variation increment, the value of which is predefined and integrated into the device by the manufacturer of the motor vehicle. The result of the operation is then stored in the ignition advance variable $AV_{AP}$ applied to the spark plug 9. The subsequent test substep E34 consists in detecting the presence of pinking in the engine, again by means of the sensor 11. If a pinking phenomenon is detected, the substep E33 is repeated. If not, there follows a substep E35. This substep E35 consists in assigning the variable $AV_{OPT}$ the value of the ignition advance $AV_{AP}$ applied during the most recent activation of the substep E34.

Symmetrically, the substep E36 consists in calculating the result of the operation $AV_{AP} + AV_{INC}$ and storing that result in the variable $AV_{AP}$. There follows a new test substep E37 in which the question is whether or not the pinking phenomenon has occurred. If pinking is not detected, the substep E34 is repeated. If occurrence of the pinking phenomenon is detected, there follows a substep E38. This consists in assigning the variable $AV_{OPT}$ the value of the result of the operation $AV_{AP} - AV_{INC}$.

In this way, whether or not the pinking phenomenon is detected during the step E32, the optimum ignition advance $AV_{OPT}$ is always the highest possible value of the applied ignition advance $AV_{AP}$ that prevents the presence of pinking.

Accordingly, by means of a control device as described above, it is possible to detect a failure of the control valve of the exhaust gas recirculation device of a controlled ignition engine regardless of the operating point. Such a device also has the advantage of not necessitating any additional sensor as it uses sensors that generally exist already in most motor vehicles.

The invention claimed is:

1. A control device for an internal combustion engine, the engine including at least one spark plug, an ignition advance management device to determine and to apply an optimum ignition advance of the spark plug, and an exhaust gas recirculation device equipped with a gas recirculation control valve, the control device comprising:
   first actuating means to force opening and closing of the control valve;
   a map in which are stored theoretical ignition advance values as a function of engine speed and engine load;
   first calculation means to calculate a diagnostic criterion as a function of the theoretical ignition advance determined from the map and the optimum ignition advance; and
   comparison means to compare the diagnostic criterion to a control valve failure threshold.

2. The control device as claimed in claim 1, wherein the ignition advance management device includes a pinking sensor to detect the appearance of a phenomenon of pinking in the engine.

3. The control device as claimed in claim 2, wherein the optimum ignition advance determined by the management device is a highest ignition advance prior to detection by the pinking sensor of a phenomenon of pinking in the engine.

4. The control device as claimed in claim 1, wherein the first calculation means include a first comparator, the diagnostic criterion being equal to a difference between the optimum ignition advance and the theoretical ignition advance.

5. The control device as claimed in claim 1, further comprising:

second calculation means to detect if predefined diagnostic conditions are combined and to inhibit the first calculation means and the comparison means if the conditions are not combined.

6. The control device as claimed in claim 5, wherein the diagnostic conditions include at least one condition chosen from a condition bearing on the engine speed that must be substantially constant for a predefined time and a condition bearing on the engine load that must be substantially constant for a predefined time.

7. The control device as claimed in claim 4, further comprising:
   display means to signal a failure of the control valve if the diagnostic criterion is above the control valve failure threshold.

8. The control device as claimed in claim 1, further comprising:
   iteration means including:
      a counter to be reset to zero at a start of a measurement and incremented on each iteration,
      a second comparator to compare a value held by the counter with a predefined number of iterations, and
      third calculation means to store, on each iteration, the calculated diagnostic criterion, to calculate an average of all the calculated diagnostic criteria once the number of iterations is reached, and to compare the average to the control valve failure threshold.

9. A method of controlling an internal combustion engine by means of a device as claimed in claim 1, comprising:
   a) modifying the position of the control valve;
   b) calculating the theoretical ignition advance by the map;
   c) determining an optimum ignition advance by the ignition advance management device;
   d) calculating the diagnostic criterion from the theoretical ignition advance and the optimum ignition advance; and
   e) comparing the diagnostic criterion to a control valve failure threshold.

10. The control method as claimed in claim 9, further comprising:
    detecting if conditions of the diagnosis are combined, the diagnostic conditions including at least one condition chosen from a condition bearing on the engine speed that must be substantially constant for a predefined time and a condition bearing on the engine load that must be substantially constant for a predefined time.

11. The control method as claimed in claim 9, wherein the control device further includes display means, the control method including a final step in which a failure of the control valve is signaled by the display means if the diagnostic criterion exceeds the failure threshold.

12. The control method as claimed in claim 9, wherein the ignition advance management device includes a pinking sensor able to detect the appearance of a pinking phenomenon in the engine, the step d) including the following substeps:
    p) determining an initial ignition advance from a quantity of exhaust gas introduced into an inlet duct and applied to the spark plug,
    q) if the sensor detects the presence of a pinking phenomenon, the method goes directly to the substep t),
    r) increasing the applied ignition advance by a predefined amount and applying the new ignition advance to the engine,
    s) the method returns to the substep q), and
    t) not changing the applied ignition advance and defining the optimum ignition advance as being equal to a current value.

13. A method of control by the control device as claimed in claim 1, the control device including a counter, the method comprising:
    resetting the counter to zero;
    modifying the position of the control valve;
    calculating the theoretical ignition advance by the map;
    determining an optimum ignition advance by the ignition advance management device;
    calculating the diagnostic criterion from the theoretical ignition advance and the optimum ignition advance;
    storing a value of the calculated diagnostic criterion;
    incrementing a value held by the counter;
    comparing the value held by the counter to a number of iterations and if it is less than or equal to the number of iterations the method returns the modifying step;
    calculating an average of stored values of the calculated diagnostic criterion; and
    comparing the calculated average with the control valve failure threshold.

* * * * *